US012224537B2

(12) United States Patent
Horning

(10) Patent No.: US 12,224,537 B2
(45) Date of Patent: Feb. 11, 2025

(54) POWER CONNECTOR

(71) Applicant: TE Connectivity Solutions GmbH, Schaffhausen (CH)

(72) Inventor: Michael James Horning, Landisville, PA (US)

(73) Assignee: TE CONNECTIVITY SOLUTIONS GmbH, Schaffhausen (CH)

( * ) Notice: Subject to any disclaimer, the term of this patent is extended or adjusted under 35 U.S.C. 154(b) by 415 days.

(21) Appl. No.: 17/849,779

(22) Filed: Jun. 27, 2022

(65) Prior Publication Data

US 2023/0420896 A1 Dec. 28, 2023

(51) Int. Cl.

*H01R 25/16* (2006.01)
*H01R 13/514* (2006.01)
*H01R 13/629* (2006.01)
*H01R 13/6471* (2011.01)

(52) U.S. Cl.

CPC ........... *H01R 25/16* (2013.01); *H01R 13/514* (2013.01); *H01R 13/629* (2013.01); *H01R 13/6471* (2013.01)

(58) Field of Classification Search

CPC ...... H01R 50/00; H01R 50/16; H01R 50/161; H01R 50/168; H01R 13/514; H01R 13/516; H01R 13/518; H01R 13/629; H01R 13/631; H01R 13/646; H01R 13/6461; H01R 13/6471

USPC .................................................. 439/212, 214

See application file for complete search history.

(56) References Cited

U.S. PATENT DOCUMENTS

| | | | | |
|---|---|---|---|---|
| 2024/0266778 A1* | 8/2024 | Crighton | .............. | H01R 13/518 |
| 2024/0283198 A1* | 8/2024 | Wu | .................... | H01R 13/6587 |
| 2024/0305034 A1* | 9/2024 | Hsu | ...................... | H01R 12/716 |
| 2024/0305035 A1* | 9/2024 | Campbell | ............ | H01R 13/514 |
| 2024/0322465 A1* | 9/2024 | Huang | ................. | H01R 13/502 |

* cited by examiner

*Primary Examiner* — Khiem M Nguyen

(57) ABSTRACT

An electrical connector includes a connector housing having a base at a rear and a plug at a front of the connector housing configured to be plugged into a busbar assembly. The plug includes a slot between a first and second plug walls that receives a busbar of the busbar assembly. The electrical connector includes power contacts received in contact channels having mating ends extending along the plug walls into the slot to mate with a busbar contacts of the busbar. The electrical connector includes a cable connector assembly coupled to the connector housing. The cable connector assembly includes a cable connector housing holding a signal contact. The signal contact is electrically connected to a signal cable of the cable connector assembly. The signal contact extending along an exterior surface of the first plug wall to interface with a signal conductor of the busbar assembly when the plug is plugged into the busbar assembly.

20 Claims, 8 Drawing Sheets

POWER CONNECTOR

BACKGROUND OF THE INVENTION

The subject matter herein relates generally to power connectors.

In general, power connectors are used to supply power to electrical devices or components. In at least some electronic systems, an electrical connector is mounted to a component, such as a server rack, and coupled to a busbar assembly to supply power to the server rack. The electrical connector is plugged into the busbar assembly to receive power from the busbar assembly. However, damage may occur to the electrical connector or the busbar assembly during mating or unmating, such as when the electrical connector is hot swappable with the busbar assembly. Some known systems use control contacts to control the power circuit, such as to turn the power circuit on only after the electrical connector is fully mated with the busbar assembly. The Conventional systems electrically connect the control contact to the busbar to receive a control power signal. Other known systems use separate electrical connectors for sending data signals to control the power circuit. The additional electrical connector adds cost and complexity to the system.

There is a need for an electrical connector configured to transmit power and data.

BRIEF DESCRIPTION OF THE INVENTION

In one embodiment, an electrical connector is provided and includes a connector housing having a base at a rear of the connector housing and a plug extending forward of the base at a front of the connector housing configured to be plugged into a busbar assembly. The plug includes a slot between a first plug wall and a second plug wall. The slot configured to receive a busbar of the busbar assembly. The connector housing has contact channels through the base and extending to the slot of the plug. The electrical connector includes a first power contact received in the corresponding contact channel. The first power contact has a first mating end extending along the first plug wall into the slot to mate with a first busbar contact of the busbar. The first power contact has a first cable end configured to be terminated to a first power cable. The electrical connector includes a second power contact received in the corresponding contact channel. The second power contact has a second mating end extending along the second plug wall into the slot to mate with a second busbar contact of the busbar. The second power contact has a second cable end configured to be terminated to a second power cable. The electrical connector includes a cable connector assembly coupled to the connector housing. The cable connector assembly includes a cable connector housing holding a signal contact. The signal contact is electrically connected to a signal cable of the cable connector assembly. The signal contact extending along an exterior surface of the first plug wall to interface with a signal conductor of the busbar assembly when the plug is plugged into the busbar assembly.

In another embodiment, an electrical connector is provided and includes a connector housing having a base at a rear of the connector housing and a plug extending forward of the base at a front of the connector housing configured to be plugged into a busbar assembly. The plug includes a slot between a first plug wall and a second plug wall. The slot configured to receive a busbar of the busbar assembly. The connector housing has contact channels through the base and extending to the slot of the plug. The electrical connector includes a first power contact received in the corresponding contact channel. The first power contact has a first mating end extending along the first plug wall into the slot to mate with a first busbar contact of the busbar. The first power contact has a first cable end configured to be terminated to a first power cable. The electrical connector includes a second power contact received in the corresponding contact channel. The second power contact has a second mating end extending along the second plug wall into the slot to mate with a second busbar contact of the busbar. The second power contact has a second cable end configured to be terminated to a second power cable. The electrical connector includes a ground element coupled to the connector housing. The ground element includes a ground beam extending along an exterior surface of the second plug wall to interface with a ground conductor of the busbar assembly when the plug is plugged into the busbar assembly. The electrical connector includes a cable connector assembly coupled to the connector housing. The cable connector assembly includes a cable connector housing holding a signal contact. The signal contact is electrically connected to a signal cable of the cable connector assembly. The signal contact extending along an exterior surface of the first plug wall to interface with a signal conductor of the busbar assembly when the plug is plugged into the busbar assembly.

In a further embodiment, an electrical connector system is provided and includes a busbar assembly including a busbar housing having a first side wall and a second side wall forming a busbar cavity. The busbar assembly includes a busbar in the busbar cavity between the first and second side walls. The busbar includes a first busbar contact and a second busbar contact, a first pocket defined between the first busbar contact and the first side wall, a second pocket defined between the second busbar and the second side wall. The busbar assembly includes a conductive structure in the first pocket along the first side wall. The conductive structure includes a signal conductor. The electrical connector system includes an electrical connector coupled to the busbar assembly. The electrical connector includes a connector housing has a base at a rear of the connector housing and a plug extending forward of the base at a front of the connector housing. The plug is plugged into the busbar cavity of the busbar housing. The plug includes a slot between a first plug wall and a second plug wall. The slot receiving the busbar of the busbar assembly. The connector housing has contact channels through the base and extending to the slot of the plug. The electrical connector includes a first power contact received in the corresponding contact channel. The first power contact has a first mating end extending along the first plug wall into the slot to mate with the first busbar contact of the busbar. The first power contact has a first cable end configured to be terminated to a first power cable. The electrical connector includes a second power contact received in the corresponding contact channel. The second power contact has a second mating end extending along the second plug wall into the slot to mate with the second busbar contact of the busbar. The second power contact has a second cable end configured to be terminated to a second power cable. The electrical connector includes a cable connector assembly coupled to the connector housing. The cable connector assembly includes a cable connector housing holding a signal contact. The signal contact is electrically connected to a signal cable of the cable connector assembly. The signal contact extending along an exterior surface of the first plug wall to interface with the signal conductor of the conductive structure when the plug is plugged into the busbar cavity.

DETAILED DESCRIPTION OF THE INVENTION

Figure 1:
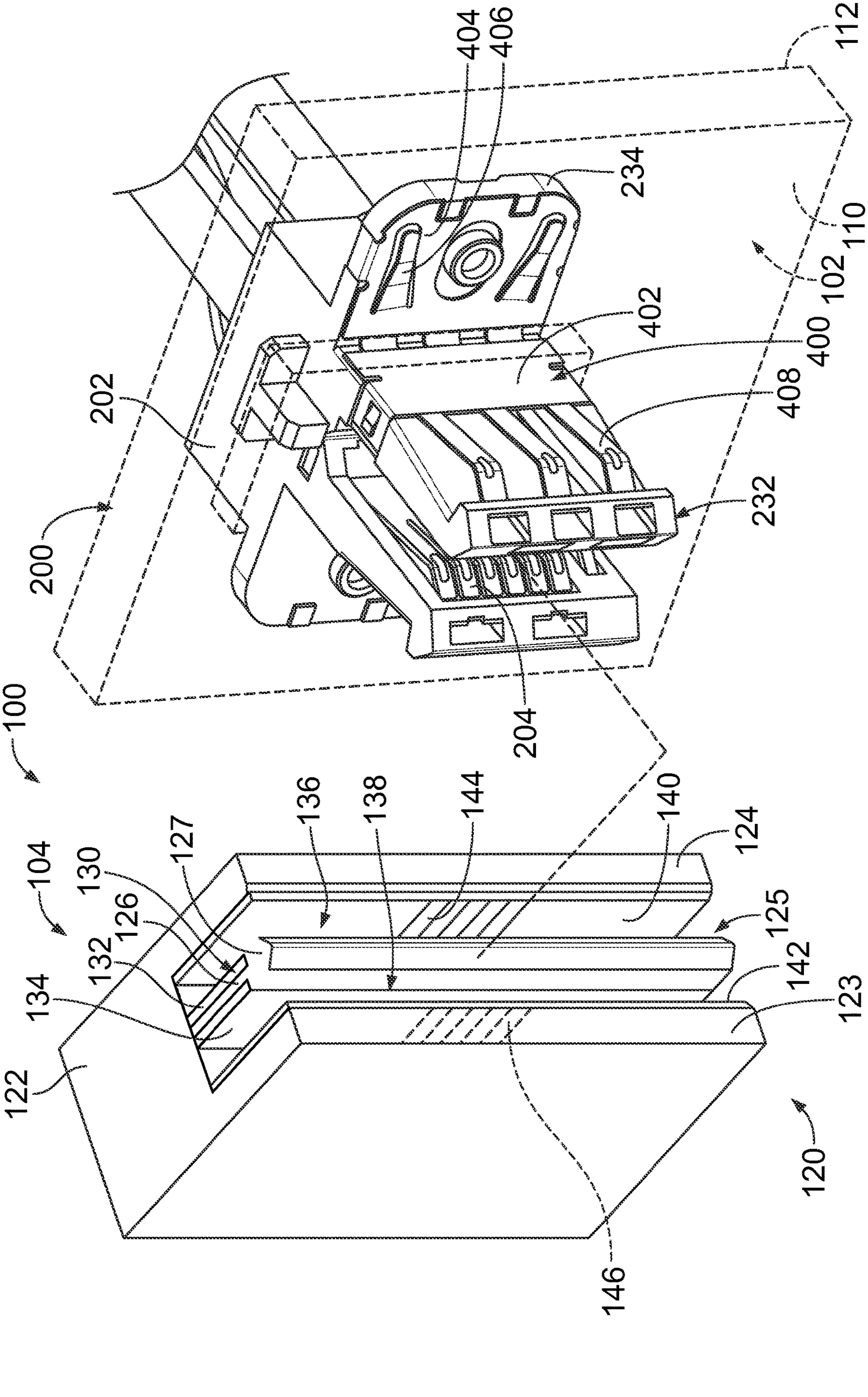
FIG. 1 illustrates an electrical connector system in accordance with an exemplary embodiment.

FIG. 1 illustrates an electrical connector system 100 in accordance with an exemplary embodiment. The electrical connector system 100 includes an electrical connector 200 configured to be electrically connected to a mating electrical connector 104. In an exemplary embodiment, the electrical connector 200 is a panel-mount electrical connector configured to be mounted to a panel 102 (shown in phantom). In various embodiments, the electrical connector 200 is a cable connector provided at an end of a cable. In the illustrated embodiment, the mating electrical connector 104 is a power connector configured to supply power to the electrical connector 200. For example, the mating electrical connector 104 includes a busbar assembly 120 supplying power to the electrical connector 200. In an exemplary embodiment, the mating electrical connector 104 is additionally used to transmit data signals between the electrical connector 200 and the mating electrical connector 104.

The panel 102 may be a chassis, a frame, a housing, or other component of the electrical connector system 100. In various embodiments, the panel 102 may be a panel of a server rack, such as a single rack unit and the electrical connector 200 is used to power the rack unit. The busbar assembly 120 may be used to power multiple rack units within the server rack.

In an exemplary embodiment, the panel 102 is planar having a front surface 110 and the rear surface 112. In various embodiments, the panel 102 is electrically conductive and may be electrically grounded. For example, the panel 102 may be a piece of sheet metal. The electrical connector 200 may be electrically commoned with the panel 102. The panel 102 includes a panel opening therethrough. For example, a portion of the electrical connector 200 may pass through the panel opening for mating with the mating electrical connector 104. In an exemplary embodiment, a portion of the electrical connector 200 is coupled to the rear surface 112 and a portion of the electrical connector 200 is coupled to the front surface 110. In an exemplary embodiment, the electrical connector 200 may be latchably coupled to the panel 102. For example, the electrical connector 200 includes one or more latching features that are latchably coupled to the panel 102.

The busbar assembly 120 includes a busbar housing 122 holding a busbar 130. The busbar housing 122 is manufactured from a dielectric material, such as a plastic material. The busbar housing 122 includes a first side wall 123 and a second side wall 124 forming a busbar cavity 125. The busbar 130 is located in the busbar cavity 125 between the first and second side walls 123, 124. In an exemplary embodiment, the busbar housing 122 includes a mid-wall 126 between the first and second side walls 123, 124. The mid-wall 126 extends into the busbar cavity 125. The mid-wall supports the busbar 130. The mid-wall 126 includes a cap 127 at a front or distal end of the mid-wall 126. The cap 127 is located forward of the busbar 130. The cap 127 is a touch-proof feature of the busbar assembly 120 that prevents inadvertent touching of the busbar 130.

The busbar 130 includes a first busbar contact 132 and a second busbar contact 134. The first busbar contact 132 may be a positive contact and the second busbar contact 134 may be a negative contact. The first busbar contact 132 may be a cathode and the second busbar contact 134 may be an anode. In an exemplary embodiment, the busbar contacts 132, 134 are metal plates. The busbar contacts 132, 134 are separated by the mid-wall 126. The busbar contacts 132, 134 are exposed in the busbar cavity 125 for mating with the electrical connector 200. In various embodiments, the mid-wall may be stacked with the busbar contacts 132, 134, separate from the busbar housing 122, and coupled to the base wall of the busbar housing 122.

In an exemplary embodiment, the busbar cavity 125 is divided into a first pocket 136 and a second pocket 138. The first pocket 136 is defined between the mid-wall 126 and the first side wall 123. The second pocket 138 is defined between the mid-wall 126 and the second side wall 124. The first busbar contact 132 is exposed in the first pocket 136 for mating with the electrical connector 200. The second busbar contact 134 is exposed in the second pocket 138 for mating with the electrical connector 200.

In an exemplary embodiment, the busbar assembly 120 includes a first conductive structure 140 in the busbar cavity 125 and a second conductive structure 142 in the busbar cavity 125. The first conductive structure 140 is located in the first pocket 136 for mating with the electrical connector 200. The first conductive structure 140 may be a printed circuit board in various embodiments. In other embodiments, the first conductive structure 140 may be a connector, a contact, or other conductive structure. In an exemplary embodiment, the first conductive structure 140 is coupled to an interior surface of the first side wall 123. The first conductive structure 140 faces the first busbar contact 132 across the first pocket 136. The first conductive structure 140 includes first conductors 144. The first conductors 144 are circuits or contacts. The first conductors 144 may be pads, traces, vias or other circuit components. In various embodiments, the first conductors 144 are signal conductors; however, the first conductors 144 may additionally or alternatively be ground conductors or power conductors in alternative embodiments. In the illustrated embodiment, the first conductive structure 140 includes a plurality of the first conductors 144, such as three first conductors 144, arranged at a predetermined pitch.

The second conductive structure 142 is located in the second pocket 138 for mating with the electrical connector 200. The second conductive structure 142 may be a printed circuit board in various embodiments. In other embodiments, the second conductive structure 142 may be a connector, a contact, or other conductive structure. In an exemplary embodiment, the second conductive structure 142 is coupled to an interior surface of the second side wall 124. The second conductive structure 142 faces the second busbar contact 134 across the second pocket 138. The second conductive structure 142 includes second conductors 146. The second conductors 146 are circuits or contacts. The second conductors 146 may be pads, traces, vias or other circuit components. In various embodiments, the second conductors 146 are ground conductors; however, the second conductors 146 may additionally or alternatively be signal conductors or power conductors in alternative embodiments. In the illustrated embodiment, the second conductive structure 142 includes a plurality of the second conductors 146, such as three second conductors 146, arranged at a predetermined pitch. In alternative embodiments, the second conductive structure 142 may be a sheet of metal defining a ground plane or ground contact.

Figure 2:
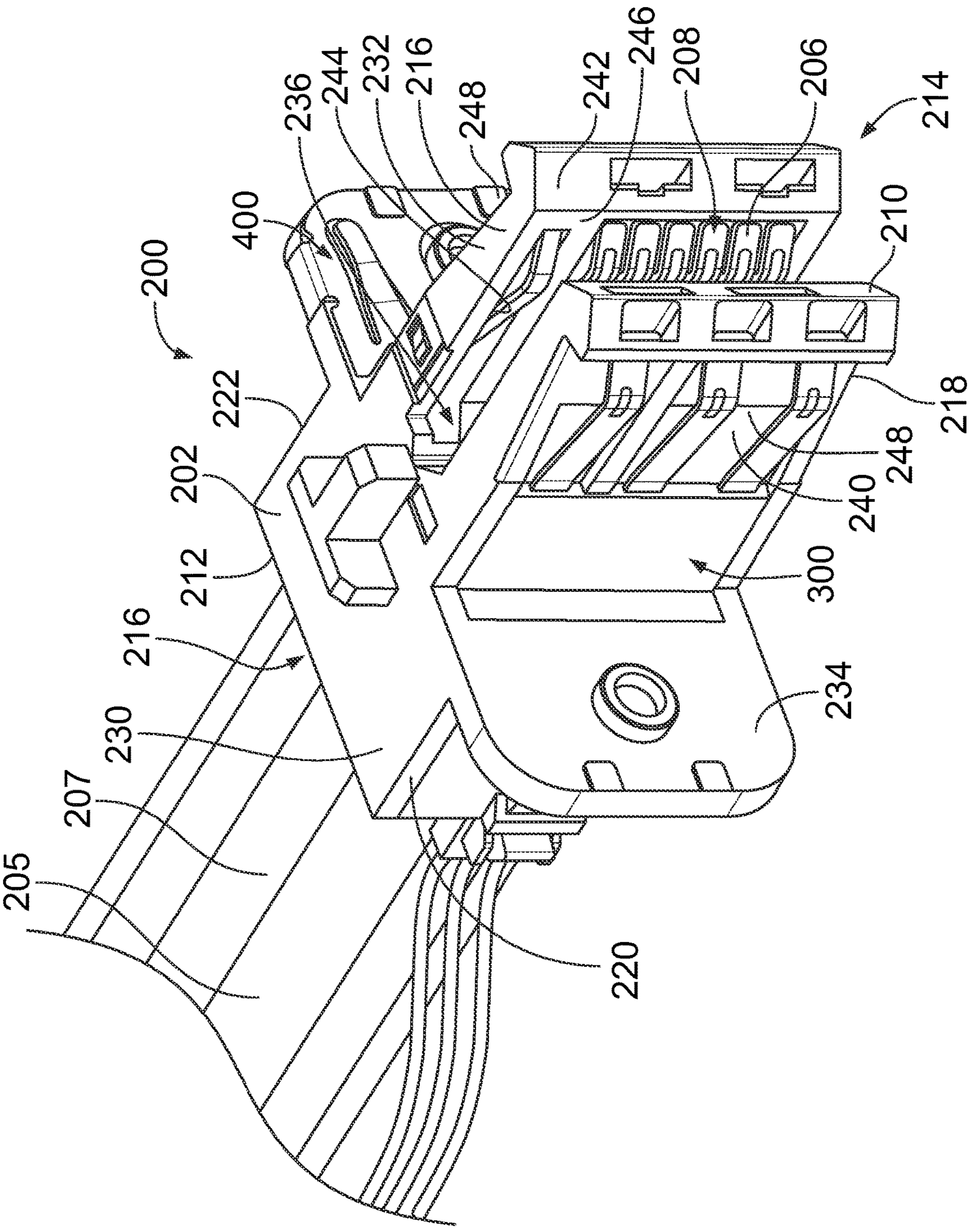
FIG. 2 is a front perspective view of the electrical connector in accordance with an exemplary embodiment.

FIG. 2 is a front perspective view of the electrical connector 200 in accordance with an exemplary embodiment. The electrical connector 200 includes a connector housing 202 holding a first power contact 204 (shown in FIG. 1) and a second power contact 206. In an exemplary embodiment, the electrical connector 200 includes a cable connector assembly 300 coupled to the connector housing 202. In an exemplary embodiment, the electrical connector 200 includes a ground element 400 coupled to the connector housing 202.

The first and second power contacts 204, 206 are configured to be electrically connected to the mating electrical connector 104 (shown in FIG. 1). For example, the power contacts 204, 206 are electrically connected to the first and second busbar contacts 132, 134 of the busbar assembly 120 (shown in FIG. 1). In an exemplary embodiment, the power contacts 204 are provided at ends of power cables 205, 207 extending from the connector housing 202. In an exemplary embodiment, each power contact 204, 206 includes a mating end 208 and a cable end (not shown). The mating end 208 may include spring beams or other types of contacts defining a mating interface for mating with the busbar assembly 120. The cable end is configured to be terminated to the power cable 205, 207, such as being welded or crimped to the end of the power cable 205, 207.

The cable connector assembly 300 is configured to be electrically connected to the mating electrical connector 104. For example, the cable connector assembly 300 is electrically connected to the first conductive structure 140 (shown in FIG. 1) of the busbar assembly 120.

The ground element 400 is configured to be electrically connected to the mating electrical connector 104. For example, the ground element 400 is electrically connected to the second conductive structure 142 (shown in FIG. 1) of the busbar assembly 120.

The connector housing 202 includes a front 210 and a rear 212. The front 210 defines a mating end 214 configured to be mated with the mating electrical connector 104. The cables 205, 207 extend from a cable end of the connector housing 202. In the illustrated embodiment, the rear 212 defines the cable end. However, the electrical connector 200 may be a right angle connector with the cables extending from a top 216 or a bottom 218 of the connector housing 202 or extending from a first side 220 or a second side 222 of the connector housing 202.

In an exemplary embodiment, the connector housing 202 includes a base 230 at the rear 212 and a plug 232 at the front 210. The connector housing 202 includes a flange 234 extending from the base 230. In various embodiments, the flange 234 may extend from the base 230 at the sides 220, 222. In other various embodiments, the flange 234 may extend from the base 230 at the top 216 and/or the bottom 218. The flange 234 is used for mounting the electrical connector 200 to the panel 102. For example, the flange 234 may face the rear surface 112 of the panel 102. The base 230 is located rearward of the flange 234, and is thus configured to be located behind the panel 102. The plug 232 extends forward of the flange 234, and thus is configured to be located forward of the panel 102. For example, the plug 232 is configured to extend through the panel opening for mating with the busbar assembly 120.

In an exemplary embodiment, the connector housing 202 includes contact channels 236 that receive the power contacts 204, 206. The contact channels 236 extend into the base 230 and into the plug 232. The contacts 204, 206 are configured to be terminated to the cable 205, 207 in the base portion of the contact channels 236. The contacts 204, 206 are configured to be mated with the busbar assembly 120 in the plug portion of the contact channels 236.

In an exemplary embodiment, the plug 232 includes a first plug wall 240 and a second plug wall 242 forming a slot 244 therebetween. Each of the plug walls 240, 242 include an interior surface 246 and an exterior surface 248. The interior surface 246 faces the slot 244. The slot 244 is open at the front 210 to receive the busbar 130. The contacts 204, 206 are exposed within the slot 244 for mating with the corresponding first and second busbar contacts 132, 134 of the busbar 130. For example, the contacts 204, 206 extend along the interior surfaces 246 of the corresponding plug walls 240, 242. In the illustrated embodiment, the slot 244 extends vertically from the top 216 to the bottom 218. For example, the slot 244 is open at the top 216 and open at the bottom 218. The slot 244 may have other shapes in alternative embodiments. In other alternative embodiments, a plurality of the slots 244 may be provided, such as individual slots for each of the contacts 204, 206. In the illustrated embodiment, the plug walls 240, 242 are oriented vertically and provided at the first side 220 and the second side 222 of the plug 232. Additional plug walls may be provided in alternative embodiments.

The cable connector assembly 300 is coupled to the first plug wall 240. For example, the cable connector assembly 300 extends along the exterior surface 248 of the first plug wall 240 for mating with the first conductive structure 140 of the busbar assembly 120.

The ground element 400 is coupled to the second plug wall 242. For example, the ground element 400 extends along the exterior surface 248 of the second plug wall 242 for mating with the second conductive structure 142 of the busbar assembly 120. The ground element 400 is configured to be electrically connected to the panel 102. For example, the ground element 400 is used to electrically common the panel 102 and the busbar assembly 120.

With additional reference back to FIG. 1, the ground element 400 is electrically conductive. In an exemplary embodiment, the ground element 400 is stamped and formed from a metal sheet. In the illustrated embodiment, the ground element 400 includes a plug wall 402 extending along the plug 232 and a flange wall 404 extending along the flange 234. The ground element 400 includes one or more panel tabs 406 extending from the flange wall 404 configured to engage the rear surface 112 of the panel 102. The panel tabs 406 are deflectable and extend out of the plane of the flange wall 404 to interface with the panel 102. The ground element 400 includes one or more ground beams 408 extending from the plug wall 402 configured to engage the busbar assembly 120. The ground beams 408 are deflectable and extend out of the plane of the plug wall 402 to interface with the busbar assembly 120. In the illustrated embodiment, three ground beams 408 are provided; however, greater or fewer ground beams 408 may be provided in alternative embodiments. The ground beams 408 including mating interfaces for mating with the busbar assembly 120. The mating interfaces may be outward facing to engage corresponding conductors 146 of the second conductive structure 142. The ground element 400 may be secured to the connector housing 202 using clips, brackets, fasteners, heat stakes, adhesive, or other securing elements. The ground element 400 may have other sizes, shapes, and/or features in alternative embodiments.

Figure 3:
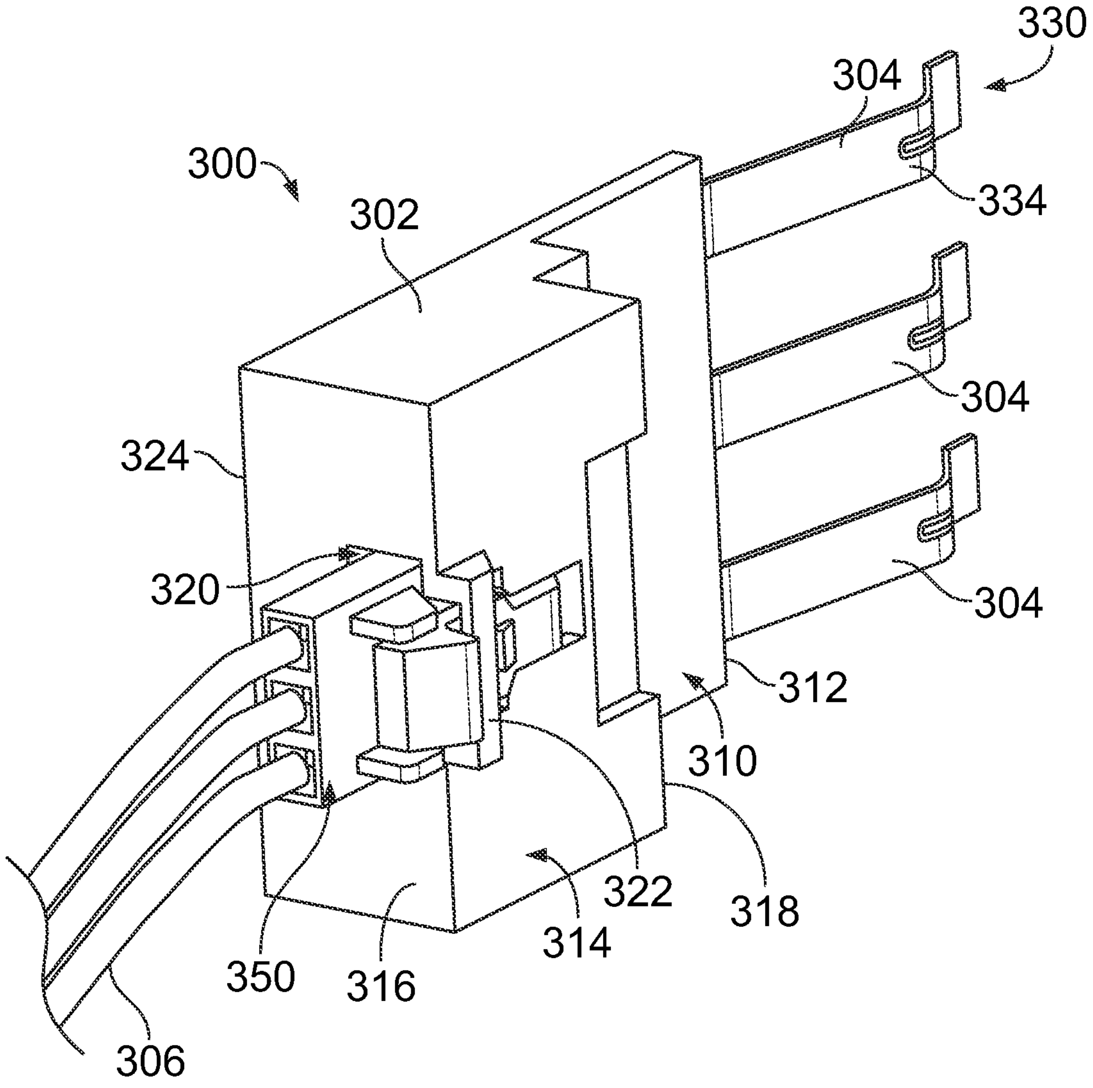
FIG. 3 is a rear perspective view of the cable connector assembly in accordance with an exemplary embodiment.
Figure 4:
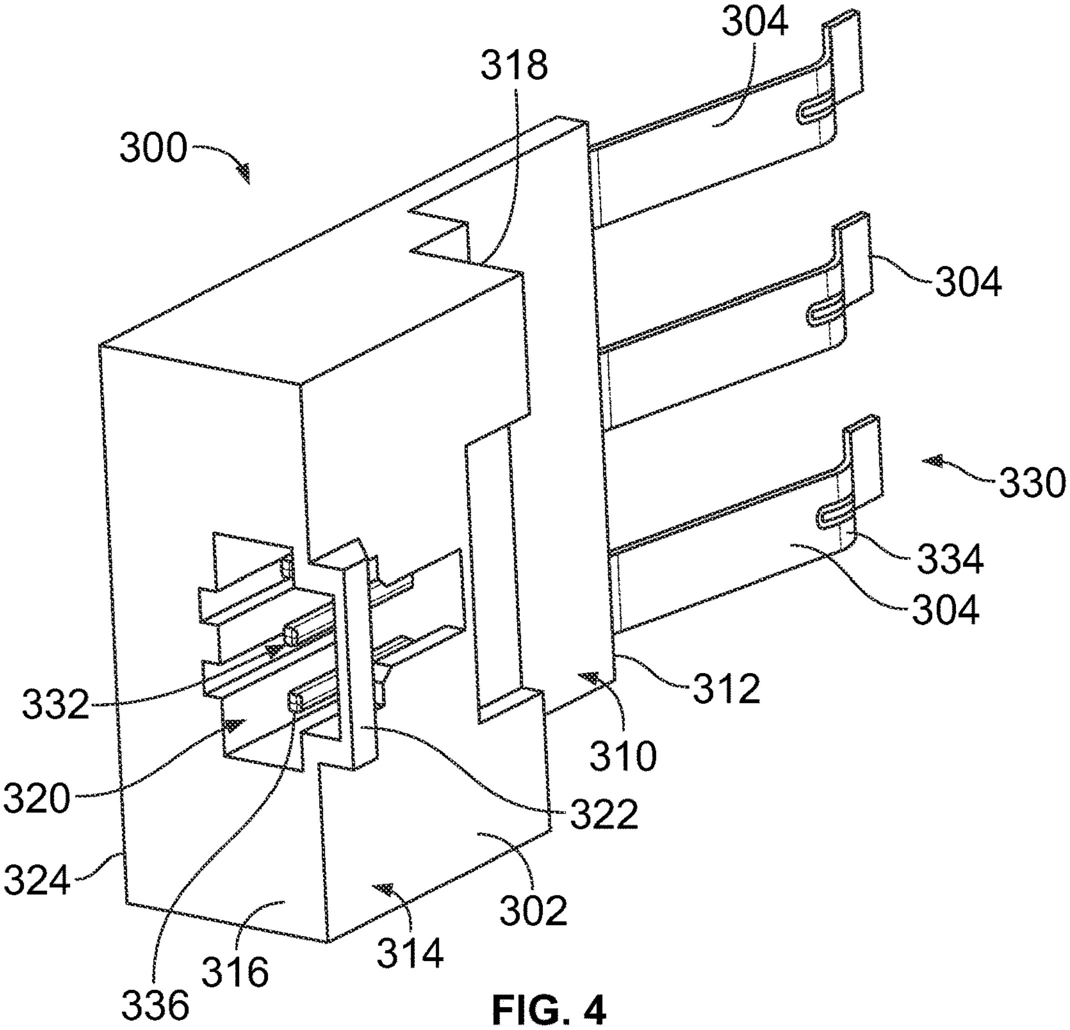
FIG. 4 is a rear perspective view of a portion of the cable connector assembly in accordance with an exemplary embodiment.

FIG. 3 is a rear perspective view of the cable connector assembly 300 in accordance with an exemplary embodiment. FIG. 4 is a rear perspective view of a portion of the cable connector assembly 300 in accordance with an exemplary embodiment.

The cable connector assembly 300 includes a cable connector housing 302 holding signal contacts 304 electrically connected to corresponding signal cables 306. In an exemplary embodiment, the cable connector assembly 300 includes a cable connector 350 removably coupled to the cable connector housing 302 to mate to and un-mate from the signal contacts 304 at a separable mating interface. The signal cables 306 are part of the cable connector 350. The signal cables 306 are electrically connected to the signal contacts 304 through the cable connector 350. However, in alternative embodiments, the signal cables 306 may be terminated directly to the signal contacts 304, such as by a solder connection, a crimp connection, or another termination method without the use of the cable connector 350.

The cable connector housing 302 includes a front portion 310 at a front 312 of the cable connector housing 302 and a rear portion 314 at a rear 316 of the cable connector housing 302. A shoulder 318 is defined between the front and rear portions 310, 314. In an exemplary embodiment, the cable connector housing 302 may be overmolded over the signal contacts 304. Alternatively, the cable connector housing 302 may be pre-molded and the signal contacts 304 are loaded into the cable connector housing 302. The signal contacts 304 may extend from the cable connector housing 302 for mating with the busbar assembly 120. The signal contacts 304 may extend from the cable connector housing 302 for connection to the signal cables 306.

The cable connector housing 302 includes a receptacle 320 at the rear portion 314. The receptacle 320 receives the cable connector 350 and/or the signal cables 306. The signal contacts 304 extend into the receptacle 320 for connection with the cable connector 350 and/or the signal cables 306. In an exemplary embodiment, the cable connector housing 302 includes a latching feature 322 for latchably securing the cable connector 350 in the receptacle 320. The cable connector housing 302 includes an inner surface 324. The inner surface 324 is configured to face the connector housing 202 (shown in FIG. 2). In the illustrated embodiment, the cable connector housing 302 is a single piece housing. However, the cable connector housing 302 may be a multi-piece housing in alternative embodiments.

In an exemplary embodiment, the signal contacts 304 are stamped and formed contacts. The signal contacts 304 may be formed from a leadframe and the cable connector housing 302 may be overmolded over the leadframe. Each signal contact 304 extends between a mating end 330 and a terminating end 332 (FIG. 4). The mating end 330 is configured for mating with the busbar assembly 120. In the illustrated embodiment, the signal contact 304 includes a spring beam 334 at the mating end 330. The spring beam 334 extends forward of the front 312 of the cable connector housing 302. The spring beam 334 is deflectable. The spring beam 334 includes a mating interface for mating with the corresponding conductor 144 of the first conductive structure 140 (shown in FIG. 1). The mating interface may be provided proximate to the distal end of the spring beam 334. The mating interface is outward facing. The signal contacts 304 may extend from the cable connector housing 302 for connection to the signal cables 306. In the illustrated embodiment, the signal contact 304 includes a pin 336 at the terminating end 332. The pin 336 is located in the receptacle 320. The pin 336 is configured to be mated with the cable connector 350. Other types of terminating ends may be provided in alternative embodiments, such as a socket, a solder pad, and the like.

Figure 5:
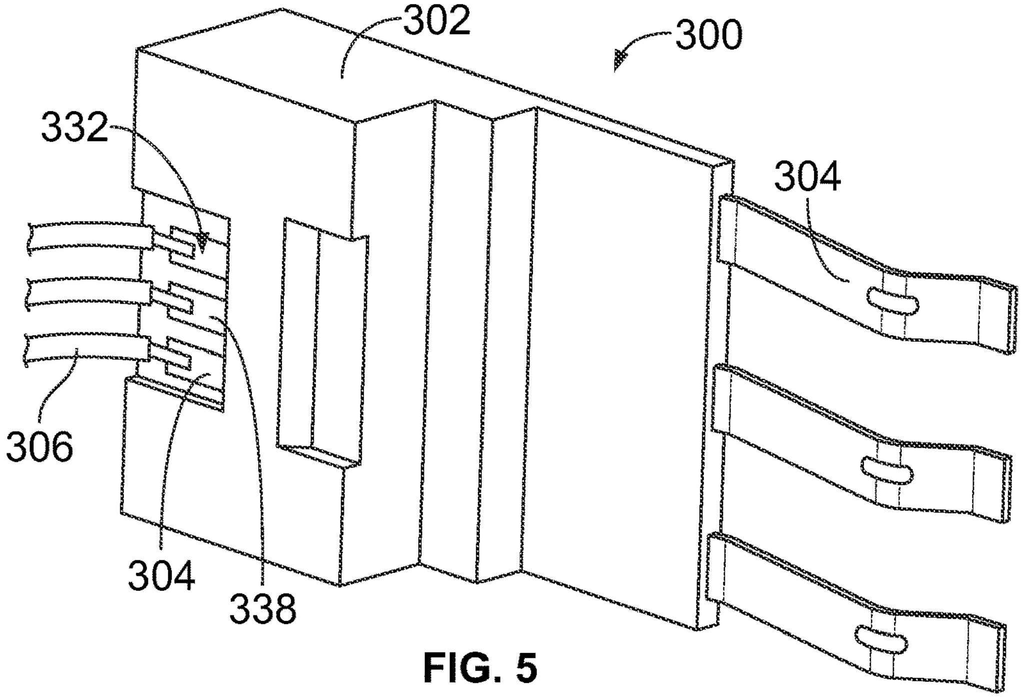
FIG. 5 is a front perspective view of the cable connector assembly in accordance with an exemplary embodiment.

FIG. 5 is a front perspective view of the cable connector assembly 300 in accordance with an exemplary embodiment. In the illustrated embodiment, the cable connector assembly 300 is provided without the cable connector 350 (shown in FIG. 3). Rather, the cables 306 are terminated directly to the terminating ends 332 of the signal contacts 304. In the illustrated embodiment, the signal contacts 304 include solder pads 338 at the terminating ends 332. The cables 306 are soldered to the solder pads 338. The solder pads 338 may be exposed at the outer surface of the cable connector housing 302. Alternatively, the solder pads 338 may be surrounded or enclosed within the cable connector housing 302, such as in a receptacle or due to the cable connector housing 302 being overmolded over the terminating ends 332 and the cables 306.

Figure 6:
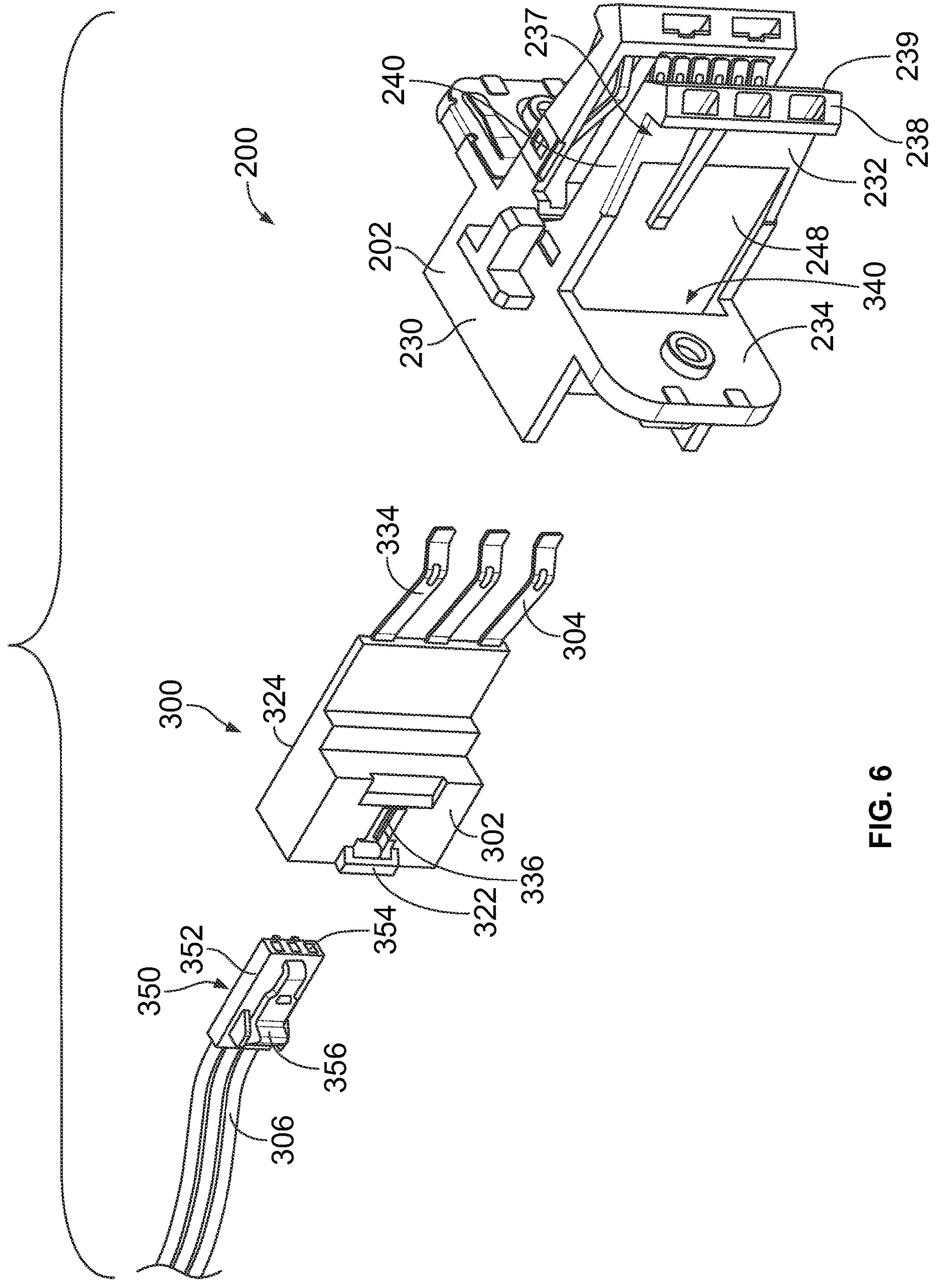
FIG. 6 is an exploded view of the electrical connector in accordance with an exemplary embodiment.

FIG. 6 is an exploded view of the electrical connector 200 in accordance with an exemplary embodiment. FIG. 6 shows the embodiment of the cable connector assembly 300 shown in FIG. 3 including the cable connector 350. The cable connector 350 includes a housing 352 holding cable connector contacts 354. The cable connector contacts 354 are electrically connected to the signal cables 306. For example, the cable connector contacts 354 may be crimped or soldered to the ends of the signal cables 306. The cable connector contacts 354 may be sockets configured to receive the pins 336 of the signal contacts 304. The housing 352 includes a latch 356 configured to be latchably coupled to the latching feature 322 of the cable connector housing 302.

In an exemplary embodiment, the cable connector housing 302 includes a connector port 340 that receives the cable connector assembly 300. The cable connector assembly 300 is removable from the connector housing 202, such as to repair or replace components of the electrical connector 200. The connector port 340 is open along the base 230 and the plug 232. In the illustrated embodiment, the connector port 340 extends through the flange 234. The cable connector assembly 300 is received in the connector port 340 to extend along the exterior surface 248 of the first plug wall 240. For example, the inner surface 324 of the cable connector housing 302 is configured to be coupled to the exterior surface 248. The spring beams 334 are configured to be coupled to the exterior surface 248 of the first plug wall 240 to interface with the signal conductors 144 of the busbar assembly 120 (shown in FIG. 1) when the plug 232 is plugged into the busbar assembly 120.

When assembled, the first plug wall 240 is located between the signal contacts 304 and the first power contact 204. The first plug wall 240 electrically separates the signal contacts 304 and the first power contact 204. In an exemplary embodiment, the spring beams 334 are configured to be received in a pocket 237 at the exterior of the first plug wall 240. The distal end of the first plug wall 240 may include guide surfaces 238, 239 that guide the first plug wall 240 into the pocket 136 of the busbar assembly 120. The guide surface 238 blocks the pocket 237, such as to protect the distal ends of the signal contacts 304 from stubbing during mating of the electrical connector 200 with the busbar assembly 120. When assembled, the spring beams 334 are configured to be mated with the signal conductors 144 of the busbar assembly 120 to send data signals between the electrical connector 200 and the busbar assembly 120. Signals, such as proximity or control signals may be transmitted through the cable connector assembly 300 to ensure that the electrical connector 200 is fully mated with the busbar assembly 120 to control the power circuit, such as to turn the power circuit on/off based on the mating status of the electrical connector 200 with the busbar assembly 120. For example, the power circuit may be off until the data signals are transmitted through the system. In an exemplary embodiment, the spring beams 334 are compressible toward the exterior surface 248 of the first plug wall 240 when mated to the busbar assembly 120.

Figure 7:
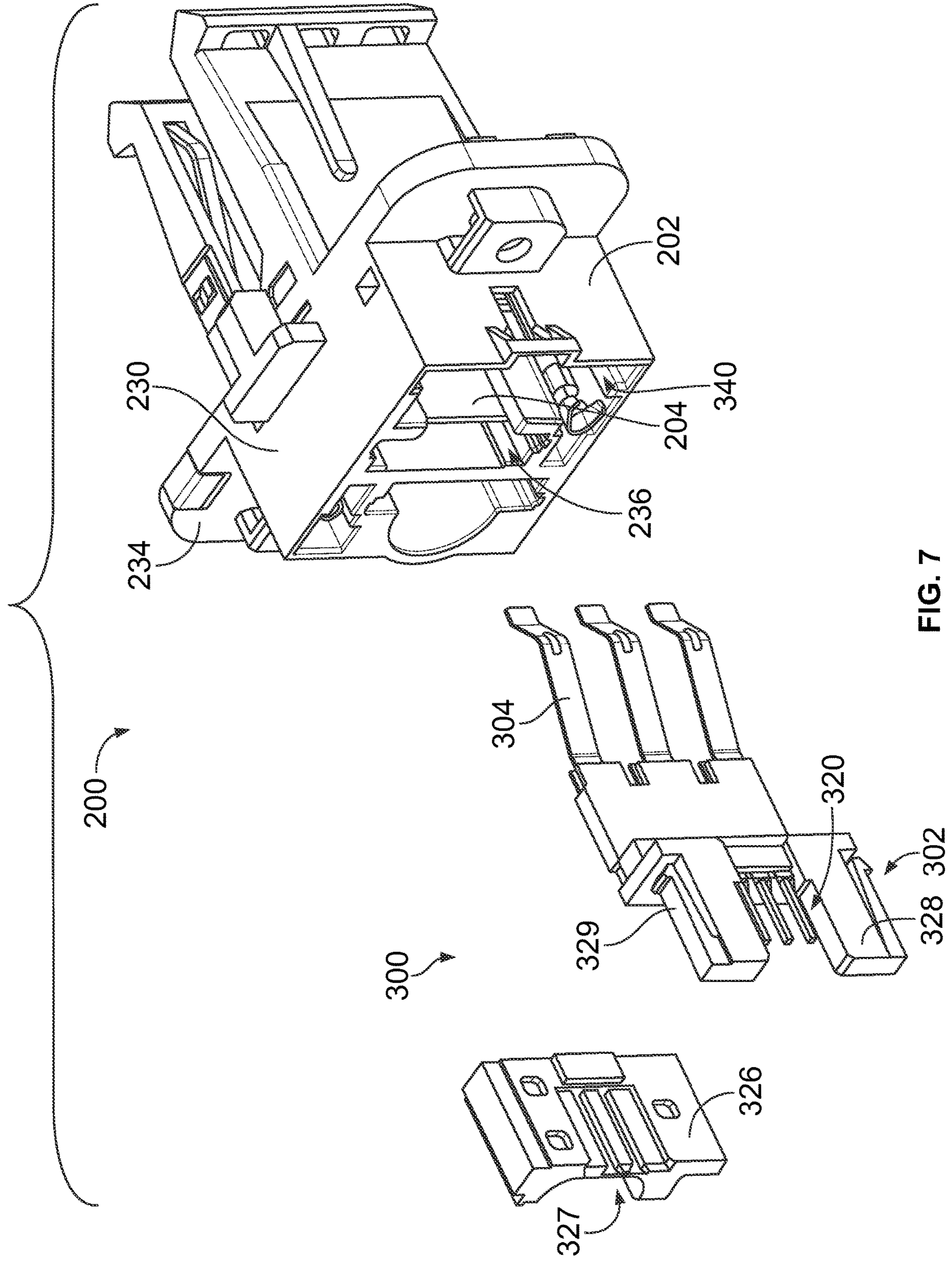
FIG. 7 is an exploded view of the electrical connector in accordance with an exemplary embodiment showing the cable connector assembly as a multi-piece assembly.
Figure 8:
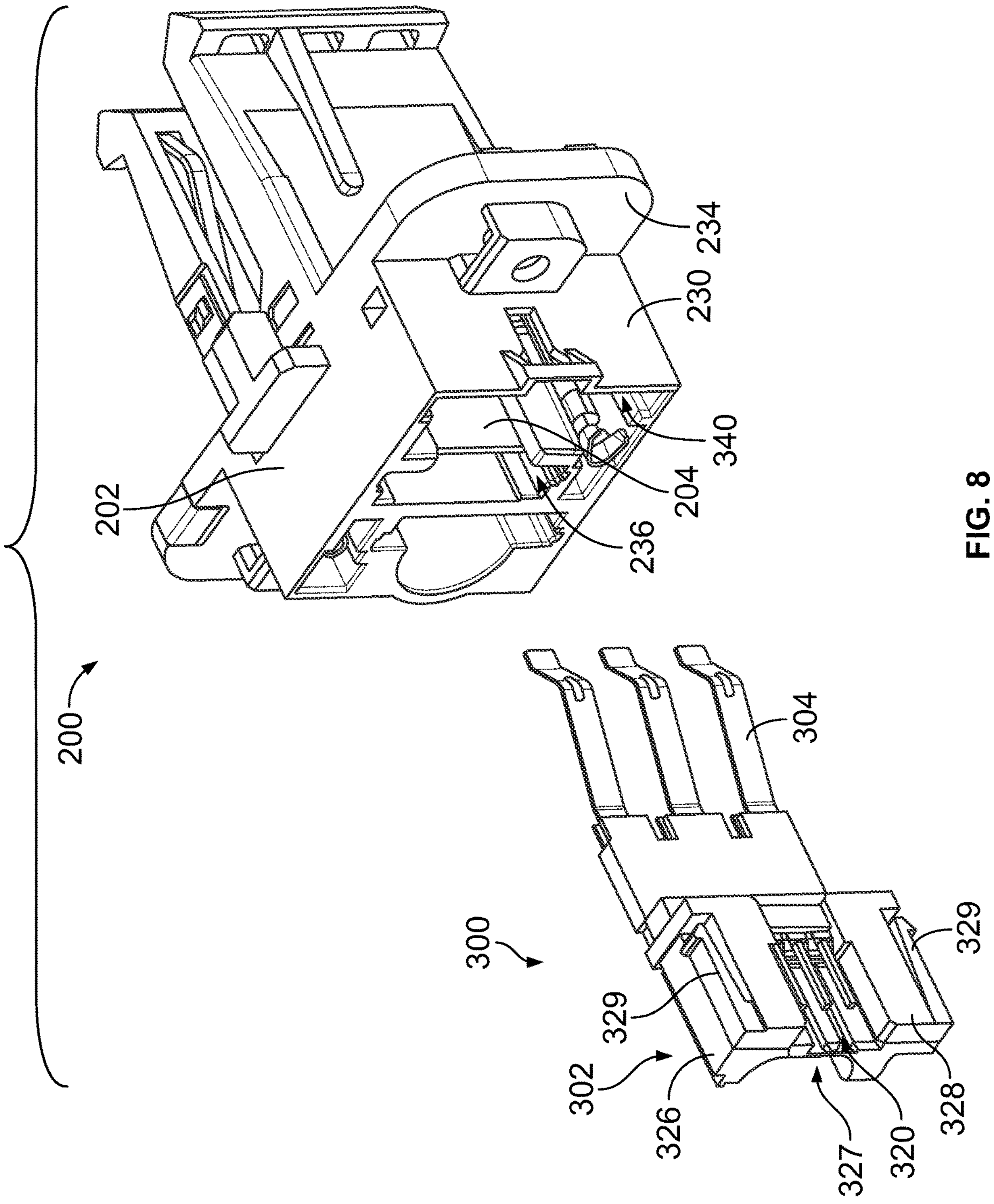
FIG. 8 is a rear perspective view of the electrical connector in accordance with an exemplary embodiment showing the cable connector assembly poised for loading into the connector housing.
Figure 9:
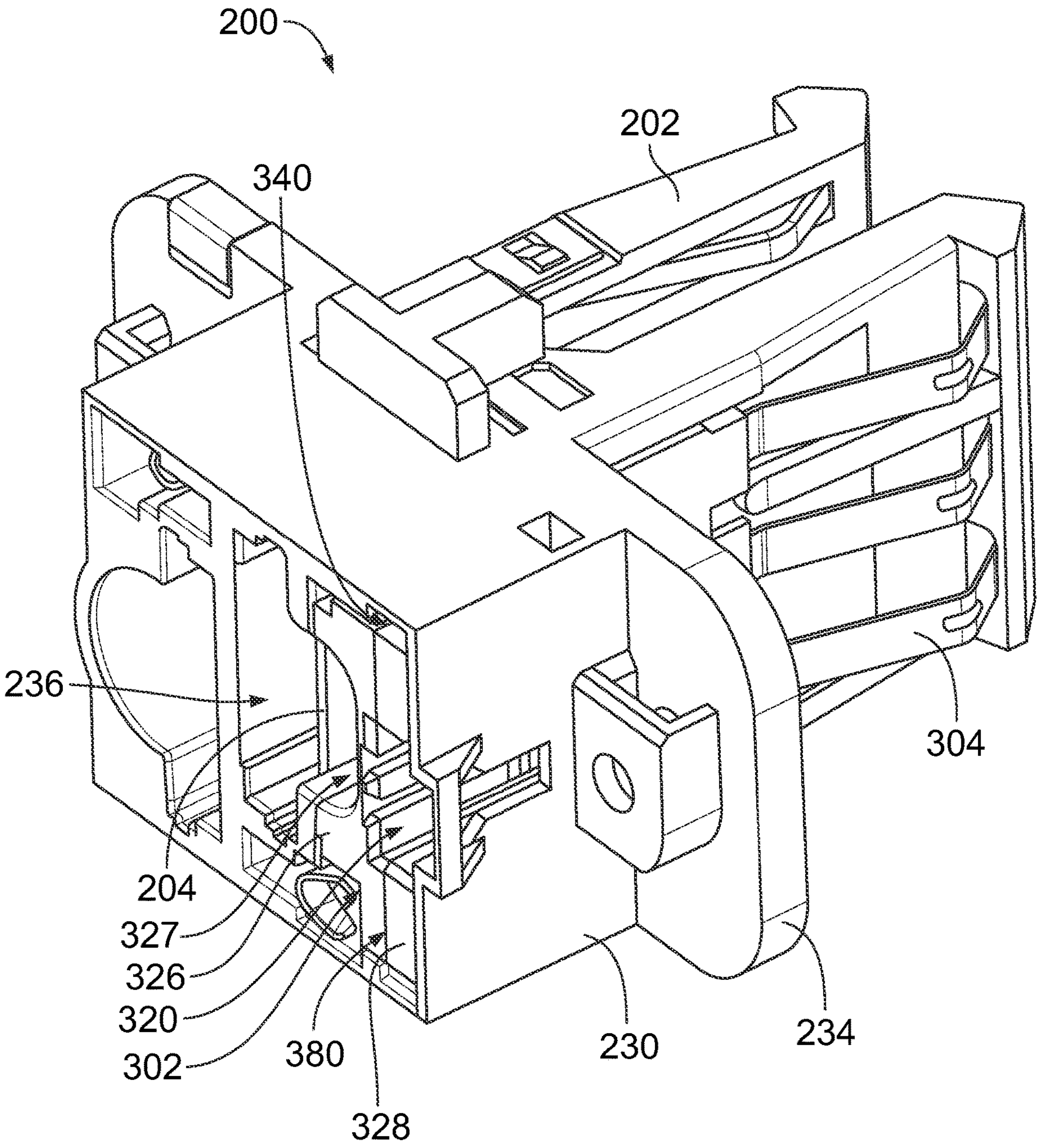
FIG. 9 is a rear perspective view of the electrical connector in accordance with an exemplary embodiment in an assembled state.

FIG. 7 is an exploded view of the electrical connector 200 in accordance with an exemplary embodiment showing the cable connector assembly 300 as a multi-piece assembly. FIG. 8 is a rear perspective view of the electrical connector 200 in accordance with an exemplary embodiment showing the cable connector assembly 300 poised for loading into the connector housing 202. FIG. 9 is a rear perspective view of the electrical connector 200 in accordance with an exemplary embodiment in an assembled state.

The connector housing 202 includes the connector port 340 that receives the cable connector assembly 300. The connector port 340 passes through the base 230 and the flange 234. In an exemplary embodiment, the connector port 340 is open to the contact channel 236. In an exemplary embodiment, the cable connector assembly 300 forms part of the contact channel 236.

In an exemplary embodiment, the cable connector housing 302 of the cable connector assembly 300 is a multi-piece housing. For example, the cable connector housing 302 includes an inner shell 326 and an outer shell 328. The inner shell 326 is coupled to the outer shell 328. In an exemplary embodiment, the inner shell 326 includes a pocket 327 at the inner side. The pocket 327 may form part of the contact channel 236. For example, the pocket 327 may receive a portion of the power cable coupled to the power contact 204. The outer shell 328 may hold the signal contacts 304. For example, the outer shell 328 may be overmolded over the signal contacts 304. The inner shell 326 and/or the outer shell 328 form the receptacle 320. In an exemplary embodiment, the outer shell 328 includes latches 329 to secure the cable connector housing 302 in the connector housing 202.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms “including” and “in which” are used as the plain-English equivalents of the respective terms “comprising” and “wherein.” Moreover, in the following claims, the terms “first,” “second,” and “third,” etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase “means for” followed by a statement of function void of further structure.

What is claimed is:

1. An electrical connector comprising:

a connector housing having a base at a rear of the connector housing and a plug extending forward of the base at a front of the connector housing configured to be plugged into a busbar assembly, the plug including a slot between a first plug wall and a second plug wall, the slot configured to receive a busbar of the busbar assembly, the connector housing having contact channels through the base and extending to the slot of the plug;

a first power contact received in the corresponding contact channel, the first power contact having a first mating end extending along the first plug wall into the slot to mate with a first busbar contact of the busbar, the first power contact having a first cable end configured to be terminated to a first power cable;

a second power contact received in the corresponding contact channel, the second power contact having a second mating end extending along the second plug wall into the slot to mate with a second busbar contact of the busbar, the second power contact having a second cable end configured to be terminated to a second power cable; and a cable connector assembly coupled to the connector housing, the cable connector assembly including a cable connector housing holding a signal contact, the signal contact being electrically connected to a signal cable of the cable connector assembly, the signal contact extending along an exterior surface of the first plug wall to interface with a signal conductor of the busbar assembly when the plug is plugged into the busbar assembly.

2. The electrical connector of claim 1, wherein the first plug wall is located between the signal contact and the first power contact.

3. The electrical connector of claim 1, wherein the first power contact includes a spring beam at the first mating end being compressible toward an interior surface of the first plug wall, the signal contact including a spring beam being compressible toward the exterior surface of the first plug wall.

4. The electrical connector of claim 1, wherein the signal contact is a first signal contact, the cable connector assembly including a second signal contact held by the cable connector housing, the second signal contact being electrically connected to a second signal cable.

5. The electrical connector of claim 1, wherein the signal contact includes a spring beam at a mating end of the signal contact and a pin at a terminating end of the signal contact, the cable connector assembly further comprising a cable connector including a cable connector contact terminated to the signal cable, the cable connector contact including a socket coupled to the pin to electrically connect the signal contact to the signal cable.

6. The electrical connector of claim 1, wherein the signal contact includes a spring beam at a mating end of the signal contact and a solder pad at a terminating end of the signal contact, the signal cable being soldered to the solder pad.

7. The electrical connector of claim 1, wherein the connector housing includes a connector port through the base, the cable connector assembly being received in the connector port.

8. The electrical connector of claim 1, wherein the connector housing includes a flange extending from the base, the flange having a connector port passing therethrough, the cable connector assembly being received in the connector port and passing through the flange to extend along the base and along the plug.

9. The electrical connector of claim 1, wherein the cable connector assembly is removable from the connector housing.

10. The electrical connector of claim 1, further comprising a ground element coupled to the connector housing, the ground element including a ground beam extending along an exterior surface of the second plug wall to interface with a ground conductor of the busbar assembly when the plug is plugged into the busbar assembly.

11. The electrical connector of claim 1, wherein the cable connector housing includes a receptacle, the signal contact including a terminating end in the receptacle, the cable connector assembly further comprising a cable connector plugged into the receptacle, the cable connector including a cable connector contact terminated to an end of the signal cable, the cable connector contact being coupled to the terminating end of the signal contact.

12. The electrical connector of claim 1, wherein the cable connector housing includes an inner shell and an outer shell forming a receptacle therebetween, the signal contact extending into the receptacle, the receptacle configured to receive a cable connector therein.

13. An electrical connector comprising:

a connector housing having a base at a rear of the connector housing and a plug extending forward of the base at a front of the connector housing configured to be plugged into a busbar assembly, the plug including a slot between a first plug wall and a second plug wall, the slot configured to receive a busbar of the busbar assembly, the connector housing having contact channels through the base and extending to the slot of the plug;

a first power contact received in the corresponding contact channel, the first power contact having a first mating end extending along the first plug wall into the slot to mate with a first busbar contact of the busbar, the first power contact having a first cable end configured to be terminated to a first power cable;

a second power contact received in the corresponding contact channel, the second power contact having a second mating end extending along the second plug wall into the slot to mate with a second busbar contact of the busbar, the second power contact having a second cable end configured to be terminated to a second power cable;

a ground element coupled to the connector housing, the ground element including a ground beam extending along an exterior surface of the second plug wall to interface with a ground conductor of the busbar assembly when the plug is plugged into the busbar assembly; and a cable connector assembly coupled to the connector housing, the cable connector assembly including a cable connector housing holding a signal contact, the signal contact being electrically connected to a signal cable of the cable connector assembly, the signal contact extending along an exterior surface of the first plug wall to interface with a signal conductor of the busbar assembly when the plug is plugged into the busbar assembly.

14. The electrical connector of claim 13, wherein the first plug wall is located between the signal contact and the first power contact.

15. The electrical connector of claim 13, wherein the first power contact includes a spring beam at the first mating end being compressible toward an interior surface of the first plug wall, the signal contact including a spring beam being compressible toward the exterior surface of the first plug wall.

16. The electrical connector of claim 13, wherein the signal contact is a first signal contact, the cable connector assembly including a second signal contact held by the cable connector housing, the second signal contact being electrically connected to a second signal cable.

17. The electrical connector of claim 13, wherein the connector housing includes a connector port through the base, the cable connector assembly being received in the connector port.

18. The electrical connector of claim 13, wherein the cable connector housing includes a receptacle, the signal contact including a terminating end in the receptacle, the cable connector assembly further comprising a cable connector plugged into the receptacle, the cable connector including a cable connector contact terminated to an end of the signal cable, the cable connector contact being coupled to the terminating end of the signal contact.

19. An electrical connector system comprising:

a busbar assembly including a busbar housing having a first side wall and a second side wall forming a busbar cavity, the busbar assembly including a busbar in the busbar cavity between the first and second side walls, the busbar including a first busbar contact and a second busbar contact, a first pocket defined between the first busbar contact and the first side wall, a second pocket defined between the second busbar and the second side wall, the busbar assembly including a conductive structure in the first pocket along the first side wall, the conductive structure including a signal conductor; and an electrical connector coupled to the busbar assembly, the electrical connector including:

a connector housing having a base at a rear of the connector housing and a plug extending forward of the base at a front of the connector housing, the plug being plugged into the busbar cavity of the busbar housing, the plug including a slot between a first plug wall and a second plug wall, the slot receiving the busbar of the busbar assembly, the connector housing having contact channels through the base and extending to the slot of the plug;

a first power contact received in the corresponding contact channel, the first power contact having a first mating end extending along the first plug wall into the slot to mate with the first busbar contact of the busbar, the first power contact having a first cable end configured to be terminated to a first power cable;

a second power contact received in the corresponding contact channel, the second power contact having a second mating end extending along the second plug wall into the slot to mate with the second busbar contact of the busbar, the second power contact having a second cable end configured to be terminated to a second power cable; and a cable connector assembly coupled to the connector housing, the cable connector assembly including a cable connector housing holding a signal contact, the signal contact being electrically connected to a signal cable of the cable connector assembly, the signal contact extending along an exterior surface of the first plug wall to interface with the signal conductor of the conductive structure when the plug is plugged into the busbar cavity.

20. The electrical connector system of claim 19, wherein the busbar assembly includes a second conductive structure in the second pocket along the second side wall, the second conductive structure including a ground conductor, the electrical connector further comprising a ground element coupled to the connector housing, the ground element including a ground beam extending along an exterior surface of the second plug wall to interface with the ground conductor of the second conductive structure when the plug is plugged into the busbar assembly.

* * * * *